United States Patent Office 2,987,541
Patented June 6, 1961

2,987,541
N-CHLORINATED DICARBAMATES OF DIHYDRIC ALCOHOLS

William E. Bissinger and Joseph A. Tursich, Akron, Ohio, assignors, by mesne assignments, to Pittsburgh Plate Glass Company
No Drawing. Filed Sept. 23, 1959, Ser. No. 841,700
14 Claims. (Cl. 260—482)

This invention relates to N-chlorinated dicarbamates of dihydric alcohols having effective active chlorine contents and other properties which render them valuable bleaching or oxidizing agents.

In accordance with this invention, chlorinated polycarbamates of polyhydric alcohols, and more particularly chlorinated dicarbamates of dihydric alcohols, are provided which contain high "active chlorine" contents and outstanding stability. By virtue of possessing these two desirable properties, among others, such compounds uniquely lend themselves to use as effective oxidizing and bleaching agents. Their stability enables them to retain their high "active chlorine" content under storage conditions until such time as they are to be used.

Insofar as is now understood, the "active chlorine" content of these compounds is provided by chlorine atoms linked directly to the carbamate nitrogens. Such chlorines are "positive" and possess oxidizing power. Thus, these compounds are characterized as N-chlorinated polycarbamates.

The precursor dicarbamates of these N-chlorinated dicarbamates, e.g. alkylene bis carbamates or alkylene ether bis carbamates, may be structurally represented as:

(1) 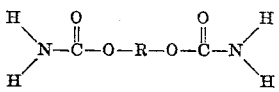

wherein R is the residue of a dihydric alcohol, $R(OH)_2$, including cycloaliphatic diols such as 1,4-cyclohexanediol and aliphatic diols such as ethylene glycol or diethylene glycol or the like and preferably has 2 to 10 carbon atoms and/or less than six ether groups. In the preferred compounds, R represents an alkylene group such as $-CH_2-CH_2-$ or an alkylene ether group of the type $-CH_2-O-CH_2-$. The residues of halogenated, especially chlorinated, dihydric alcohols are contemplated.

Determination of the "active chlorine" content of these contemplated chlorinated products of dicarbamates illustrated by Formula 1 indicates one or more hydrogen atoms linked to the carbamate nitrogens are replaced with chlorine. Basis their "active chlorine" content and chemical analysis, these compounds are of the structure:

(2) 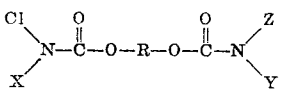

wherein R is as above defined and X, Y and Z are ideally chlorine, although one or more of X, Y and Z, usually at least two, may be hydrogen. Thus, the carbamates contain an "active chlorine" content corresponding to that obtained by replacing at least one and up to all of the hydrogen atoms linked to a carbamate nitrogen with chlorine.

The contemplated dicarbamates having an "active chlorine" content approximating the theoretical maximum, e.g. carbamates wherein the four available valences of the nitrogen atoms are filled by chlorine, are unusually effective bleaching or oxidizing agents. Ethylene bis(N,N-dichloro-O-carbamate) is outstanding in its high active chlorine content and is possessed of other physical properties including exceptional stability and a desirable degree of water solubility peculiarly adapting it for use as a bleaching agent.

As herein used, the term "active chlorine" has a precise meaning. The chlorine atoms of this compound are "positive." When functioning as an oxidizing reagent, each chlorine atom gains two electrons and becomes "negative." Each chlorine atom attached to the carbamate nitrogen of these compounds therefore functions in oxidizing reactions in the manner of two chlorine atoms in normal molecular form. "Active chlorine" content thus has reference to the oxidizing power of this compound's chlorine atoms, basis the oxidizing power of the chlorine atoms in normal molecular form. The test for determining "active chlorine" is accepted analytical practice.

These compounds may be prepared from the corresponding bis(O-carbamates) by chlorination with an agent such as hypochlorous acid. Ethylene bis(O-carbamate) or like alkylene bis(O-carbamate) is prepared, for example, by reaction of ammonia and ethylene glycol dichloroformate or like dihydric alcohol dichloroformate. Other bis(O-carbamates) are prepared similarly by reaction of ammonia with the dichloroformate of 1,4-cyclohexanediol or the like. Glycol dichloroformate is formed by phosgenation of ethylene glycol (ethanediol-1,2) according to well known techniques. See Example I of United States Letters Patent 2,397,630, granted April 2, 1946.

Ammonia and the dichloroformate are reacted at from about 0° C. to 50° C., or sometimes slightly higher temperatures. Essentially stoichiometric proportions of these reactants are employed, although a slight excess of ammonia, e.g. 5 to 15 mole percent excess, is useful to facilitate complete or near complete conversion of dichloroformate. Ammonia is used as an aqueous solution (ammonium hydroxide) of 2 to 40 percent ammonia by weight. Inert organic solvents such as benzene may be used as reaction medium diluents.

Complete removal of the ammonium chloride formed in conjunction with the carbamate is desirable, lest in the subsequent chlorination nitrogen trichloride from and there be a hazard of explosion. Repeated water washing will accomplish removal of ammonium chloride. Alternatively, the carbamate may be recrystallized from a hot aqueous solution.

Chlorination of the carbamates such as ethylene bis(O-carbamate) is accomplished in aqueous media with hypochlorous acid at between about 0° C. to 50° C. For complete chlorination, the reaction consumes four moles of hypochlorous acid for each mole of product. Somewhat higher purity products are realized by use of stoichiometric excess of hypochlorous acid and intimately contacting the reactants for an extended reaction period sometimes several hours in duration.

By adjusting the mole ratio of carbamate and hypochlorous acid (or other chlorinating agent) charged to the reaction medium, the "active chlorine" content of the carbamate composition may be varied. For example, by charging one mole of hypochlorous acid per mole of a dicarbamate such as ethylene bis(O-carbamate), a carbamate composition is provided containing an "active chlorine" content corresponding to that obtained by replacing with chlorine one of the hydrogen atoms linked to a carbamate nitrogen. Thus, by varying the mole ratio in which hypochlorous acid and dicarbamate are charged between 1 and 4 or more moles of HOCl per mole of dicarbamate, carbamate compositions are provided having "active chlorine" contents corresponding to that obtained by replacing with chlorine one to four (including fractional values) of the hydrogen atoms linked to the carbamate nitrogens.

Illustrative of the manner in which alkylene bis(O-carbamates) or bis carbamates of other dihydric alcohols is the following preparation of ethylene bis(O-carbamate):

Example I

An aqueous solution of ammonia containing 28 percent $NH_4OH$ by weight and 4.4 gram moles of $NH_4OH$ was charged to a two liter flask and cooled in an ice bath. With vigorous agitation, 187.0 grams of ethylene glycol dichloroformate was added dropwise over 60 minutes. The temperatures ranged from 6° C. to 13° C. Agitation was continued for 60 minutes more and the temperature reached 18° C.

This reaction medium was suction filtered, and the filter cake washed with 100 milliliter of water. This washed filter cake was reslurried and tested with silver nitrate to determine the presence of chloride ion. Washing in the above manner was repeated five times until the test showed no chlorine ion. After standing overnight, the product was dried at 105° C. for 3 hours. Some 79 grams of ethylene bis(O-carbamate), melting point 170–171° C., were obtained.

Employing ethylene bis(O-carbamate) prepared as above, ethylene bis(N,N-dichloro-O-carbamate) was provided in this manner:

Example II

In a 100 milliliter beaker, 0.01 gram mole of ethylene bis(O-carbamate) was mixed with 20 milliliters of water and then chilled by an ice bath. An aqueous solution of hypochlorous acid was added to this mixture in small amounts until a total of 0.04 gram mole of HOCl was added. The medium was between 2° C. and 7° C. After stirring for 10 minutes more, the reaction mixture was suction filtered. The product ethylene bis(N,N-dichloro-O-carbamate) was dried in a vacuum desiccator for 2 hours under reduced pressure. A total of 2.45 grams of 98 percent pure product of 48.5 to 49.5° melting point was prepared.

By chemical analysis, pure ethylene bis(N,N-dichloro-O-carbamate) having a melting point of 52.0° C. to 52.5° C. was found to have the following chemical composition:

| | Weight percent |
|---|---|
| Carbon | 17.40–17.26 |
| Hydrogen | 1.38–1.55 |
| Nitrogen | 10.04–10.08 |
| Chlorine | 49.14–49.56 |
| Oxygen | 23.08–22.85 |

Ethylene bis(N,N-dichloro-O-carbamate) is an off-white, crystalline solid which dissolves to the extent of 1.35 parts per hundred parts of water by weight at 25° C. According to analytical tests, this compound is of the structure:

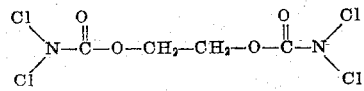

It is extremely stable. It does not detonate under sharp blows and retains substantially all of its active chlorine content even upon prolonged standing. This stability is particularly important because it allows the compound to be stored for extended periods without serious product degradation.

The active chlorine content of this ethylene bis(N,N-dichloro-O-carbamate) was determined by standard analytical technique. This showed 97.35 percent active chlorine content.

Stability upon prolonged standing of ethylene bis(N,N-dichloro-O-carbamate) above prepared was determined with these results:

| Days in Storage at 25° C. | Percent Active Chlorine Content | |
|---|---|---|
| | Dark Storage | Light Storage |
| 0 | 97.35 | 97.35 |
| 5.5 | | 97.47 |
| 7.5 | 97.44 | |
| 14.0 | 97.35 | |
| 19.5 | | 96.62 |
| 28.0 | 97.42 | |
| 66.0 | 97.57 | |

After 30 days storage at 60° C., less than 3 percent loss of active chlorine was found. Within the accuracy of the test for active chlorine, the above data demonstrates that ethylene bis(N,N-dichloro-O-carbamate) does not lose any appreciable active chlorine content upon standing under conditions of normal storage.

Example III

The procedure of Example II was duplicated substituting 1,2-propylene bis carbamate for ethylene bis(O-carbamate). The chlorinated product, 1,2-propylene bis(N,N-dichloro-O-carbamate) was oily and was of the structure:

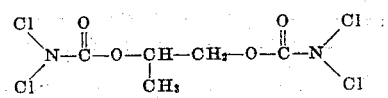

Example IV 1,3-propylene bis carbamate was chlorinated according to the procedure described in Example II, except that a 5 mole percent excess of hypochlorous acid was added. A solid, crystalline product, propylene bis(N,N-dichloro-O-carbamate), melting at 84–85° C. and having an available chlorine content of 91.4 percent was obtained. This compound is of the formula:

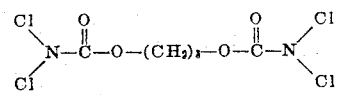

Example V

Butylene bis(N,N-dichloro-O-carbamate) was prepared according to the general procedure of Example II using 1,4-butylene bis carbamate, except that a more extended reaction period was used. The crude product was dissolved in methylene chloride and recrystallized by evaporation. This product had a melting point of 56.5 to 58.0° C., an available chlorine content of 88.50 percent, and may be depicted as:

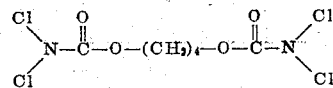

Example VI 1,6-hexamethylene bis carbamate was chlorinated according to the procedure of Example II using a two hour reaction period. The crude product was dissolved in methylene chloride and recrystallized by evaporation. An oily product containing 74.88 percent available chlorine was recovered in this manner.

The N-chlorinated product is of the formula:

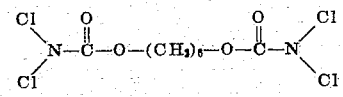

Example VII

Diethylene glycol dicarbamate was chlorinated with hypochlorous acid by adding hypochlorous acid slowly to 0.25 gram of diethylene glycol dicarbamate dissolved in 200 milliliters of water until a 25 mole percent excess of the acid had been added. The organic phase of the reaction mixture was separated by centrifugation and dried by air. An oily product having by analysis 73 percent "active chlorine" was obtained having the formula:

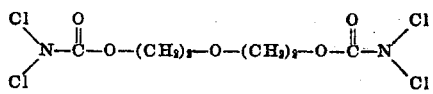

*Example VIII*

Into a one liter, three-necked, round-bottomed glass flask, equipped with a motor-driven stirrer, thermometer and adapters 250 milliliters of ice water and 29.6 grams (0.2 mole) of finely ground ethylene bis(O-carbamate) were added. The flask was surrounded by an ice-salt bath. The contents were stirred by operation of the stirrer to provide a suspension. After the contents had cooled to 4° C., 147.5 grams (0.4 mole) of an aqueous HOCl solution at 3 to 4° C. containing 14 percent HOCl by weight were slowly added over a period of 20 minutes. Following this addition, the mixture was stirred vigorously for 60 minutes. It was then suction-filtered, the filter cake washed with a little ice cold water and sucked for 20 minutes. The cake was thereafter dried in a vacuum desiccator.

This dried carbamate composition had an "active chlorine" content of 66.65 percent which corresponds approximately to an "active chlorine" content obtained by replacing with chlorine two hydrogen atoms linked to the carbamate nitrogens of the dicarbamate.

A carbamate composition is provided by using only 0.2 mole of HOCl and following the procedure of Example VIII having an "active chlorine" content corresponding to that obtained by replacing with chlorine one hydrogen atom linked to a carbamate nitrogen. By using, for example, 0.25, 0.30 or 0.35 mole of HOCl in the procedure of Example VIII, carbamate compositions result having correspondingly increased "active chlorine" contents.

Other polycarbamates such as 1,2-propylene bis carbamate, 1,3-propylene bis carbamate, 1,4-butylene bis carbamate, 1,6-hexamethylene bis carbamate, and diethylene glycol dicarbamate among others may be substituted for ethylene bis(O-carbamate) and chlorinated according to Example VIII. Obtained are compositions having "active chlorine" contents corresponding to the replacement with chlorine of one or more hydrogen atoms linked to carbamate nitrogens.

These N-chloro bis carbamates of this invention are useful as bleaching agents, oxidizing agents, disinfectants and germicides. As a bleaching agent, they may be used for bleaching paper pulp, wood, jute, felt, straw, textiles such as cottons, fats and oils. They may be formulated into solid or liquid mixtures with light duty (dishwashing) and heavy duty detergents to obtain whitening or bleaching during washing with the detergents.

The bleaching power of ethylene bis(N,N-dichloro-O-carbamate) was demonstrated by testing the ability of the compound to whiten tea stained muslin. The tests involved staining muslin cloths with a tea solution, measuring the brightness (reflectance) of the stained cloth and then washing the stained cloths at different temperatures with a solution containing ethylene bis(N,N-dichloro-O-carbamate). After this washing, the brightness of the muslin cloths was measured and compared with the brightness of the cloths when stained.

This data was obtained using an aqueous washing solution which includes 2.5 weight percent sodium tripolyphosphate (a laundry additive), 0.5 weight percent of Nacconol NR (wetting agent) and 25 or 100 parts per million by weight of the described carbamate:

| Temperature of Washing, ° C. | Concentration of ethylene bis (N,N-dichloro-O-carbamate), Parts per Million | Increase in Percent Brightness [1] |
|---|---|---|
| 32 | 25 | 2.3 |
| 40 | 25 | 1.9 |
| 60 | 25 | 5.4 |
| 27 | 100 | 2.5 |
| 41 | 100 | 4.5 |
| 60 | 100 | 7.7 |

[1] Difference between percent brightness of tea stained cloth and percent brightness of treated cloth.

This data indicates the effectiveness of ethylene bis-(N,N-dichloro-O-carbamate) as a bleaching agent. Other of the herein described compounds are also effective bleaching agents.

When used as a disinfectant or germicide, these N-chlorocarbamates may be formulated into ointments using typical ointment bodies such as petrolatum, hydrogenated oils and lanolin. They may be included in soaps such as bar soap, shaving lathers and creams, and the like as a germicidal or disinfectant component, usually in amounts 0.1 to 1 percent by weight.

Illustrative of the germicidal properties of ethylene bis(N,N-dichloro-O-carbamate) was a 100 percent kill of *Escherichia coli* and *Micrococcus pyogenes* var. *aureus* obtained in 15 seconds or less by a 50 part per million of available chlorine from a water solution of the N-chlorocarbamate in the standard Weber and Black test, American Journal Public Health, 38, 1948.

Besides the specific polyhydric alcohols from which the contemplated carbamates may be derived, it will be understood that carbamates derived from other polyhydric alcohols including 1,3-butanediol, 2,3-butanediol, dipropylene glycol, triethylene glycol, glycerol, 1,2,4-butanetriol, 1,2,3,4-butanetetrol, 1,4-cyclohexanediol, cyclopentanediols and the corresponding halogenated diols, notably the chlorinated diols such as 2-chloro-1,3-propanediol, 2,3-dichloro-1,4-butanediol among others may be chlorinated as hereinbefore indicated.

This application is a continuation-in-part of our application Serial No. 663,605 filed June 5, 1957, and application Serial No. 609,556, filed September 13, 1956, now abandoned.

Although the invention has been described by reference to specific details of certain embodiments, it is not intended that the invention be construed as limited to such details except insofar as they are included in the appended claims.

We claim:

1. N-chlorinated polycarbamate of a saturated polyhydric alcohol having 2 to 4 hydroxyl groups and 2 to 10 carbon atoms, said N-chlorinated polycarbamate having an active chlorine content corresponding to that obtained by replacing with chlorine at least one hydrogen atom linked directly to a carbamate nitrogen.

2. N-chlorinated polycarbamate of a saturated dihydric alcohol of 2 to 10 carbon atoms having an active chlorine content corresponding to that obtained by replacing with chlorine at least one hydrogen atom linked directly to a carbamate nitrogen.

3. N-chlorinated polycarbamate of a saturated polyhydric alcohol having 2 to 4 hydroxyl groups and 2 to 10 carbon atoms, said N-chlorinated polycarbamate having an active chlorine content corresponding approximately to that obtained by replacing the hydrogen atoms linked directly to the carbamate nitrogens with chlorine.

4. N-chlorinated dicarbamate of an aliphatic dihydric alcohol of 2 to 10 carbon atoms, said N-chlorinated dicarbamate having an active chlorine content corresponding approximately to that obtained by replacing the hydrogen atoms linked directly to the carbamate nitrogens with chlorine.

5. N-chlorinated alkylene bis(O-dicarbamate) having an active chlorine content corresponding approximately to that obtained by replacing the hydrogen atoms linked directly to the carbamate nitrogens with chlorine, said alkylene group having 2 to 10 carbon atoms.

6. A compound of a formula:

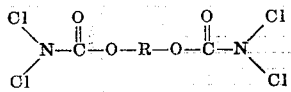

wherein R is the residue of a saturated dihydric alcohol of 2 to 10 carbon atoms.

7. An alkylene bis(N,N-dichloro-O-carbamate), said alkylene group having 2 to 10 carbon atoms.

8. Ethylene bis(N,N-dichloro-O-carbamate).
9. 1,2-Propylene bis(N,N-dichloro-O-carbamate).
10. Propylene bis(N,N-dichloro-O-carbamate).
11. Butylene bis(N,N-dichloro-O-carbamate).
12. Hexamethylene bis(N,N-dichloro-O-carbamate).
13. Diethylene ether bis(N,N-dichloro-O-carbamate).
14. An alkylene ether bis(N,N - dichloro - O-carbamate), said diethylene ether having 2 to 10 carbon atoms and up to 6 ether groups.

References Cited in the file of this patent
FOREIGN PATENTS 974,085   France _____ Sept. 27, 1950

UNITED STATES PATENT OFFICE
CERTIFICATE OF CORRECTION

Patent No. 2,987,541　　　　　　　　　　　　　　　June 6, 1961

William E. Bissinger et al.

It is hereby certified that error appears in the above numbered patent requiring correction and that the said Letters Patent should read as corrected below.

Column 2, line 41, for "from" read -- form --; line 48, for "to" read -- and --.

Signed and sealed this 17th day of July 1962.

(SEAL)
Attest:

ERNEST W. SWIDER
Attesting Officer

DAVID L. LADD
Commissioner of Patents